(12) United States Patent
Boughtwood

(10) Patent No.: US 10,027,205 B2
(45) Date of Patent: Jul. 17, 2018

(54) MOTOR OR GENERATOR APPARATUS WITH IONISABLE FLUID-FILLED GAP

(71) Applicant: Deregallera Holdings Ltd., Caerphilly (GB)

(72) Inventor: Martin Boughtwood, Caerphilly (GB)

(73) Assignee: Deregallera Holdings Ltd., Caerphilly (GB)

( * ) Notice: Subject to any disclaimer, the term of this patent is extended or adjusted under 35 U.S.C. 154(b) by 373 days.

(21) Appl. No.: 14/351,315

(22) PCT Filed: Oct. 15, 2012

(86) PCT No.: PCT/GB2012/052548
§ 371 (c)(1),
(2) Date: Apr. 11, 2014

(87) PCT Pub. No.: WO2013/054139
PCT Pub. Date: Apr. 18, 2013

(65) Prior Publication Data
US 2014/0232235 A1 Aug. 21, 2014

(30) Foreign Application Priority Data
Oct. 14, 2011 (GB) .................................. 1117798.7

(51) Int. Cl.
*H02K 13/10* (2006.01)
*H01R 39/30* (2006.01)
*H02K 13/00* (2006.01)

(52) U.S. Cl.
CPC ............. *H02K 13/10* (2013.01); *H01R 39/30* (2013.01); *H02K 13/006* (2013.01)

(58) Field of Classification Search
CPC ...... H02K 13/10; H02K 13/006; H02K 39/30; H02K 17/00; H02R 39/08; H02R 39/00;
(Continued)

(56) References Cited

U.S. PATENT DOCUMENTS 3,312,843 A * 4/1967 Krulls .................. H01R 39/646
310/219
3,984,715 A * 10/1976 Kullmann .............. H01R 39/30
310/219
(Continued)

FOREIGN PATENT DOCUMENTS

| DE | 102006046773 A1 | 4/2008 |
| EP | 1780011 A2 | 5/2007 |
| WO | 2011128700 A2 | 10/2011 |

OTHER PUBLICATIONS

International Search Report and Written Opinion in PCT/GB2012/052548, dated Apr. 3, 2014, 11 pages.

*Primary Examiner* — Michael Andrews
(74) *Attorney, Agent, or Firm* — Lempia Summerfield Katz LLC

(57) ABSTRACT

Apparatus (10) for use as a motor or generator, comprising: a first part (20) defining a first region (22); a second part (40) moveable relative to the first part (20) and spaced therefrom to form a fluid-filled gap (50), the second part (40) defining a second region (42) separated from the first region (22) by the fluid-filled gap (50) and configured to be electrically connected to the first region (22) during at least one mode of operation; wherein the apparatus (10) is configured to form an electrically conductive path between the first and second regions (22, 42) by generating a region of electrically conductive fluid in the fluid-filled gap (50) between the first and second regions (22, 42).

22 Claims, 3 Drawing Sheets

(58) Field of Classification Search
CPC .......... H02R 4/58; H01R 39/08; H01R 39/00; H01R 4/58
USPC ........................................ 310/219, 209, 232
See application file for complete search history.

(56) References Cited

U.S. PATENT DOCUMENTS

| | | | | |
|---|---|---|---|---|
| 4,047,063 | A | * | 9/1977 | Reece .................... H01R 39/30 310/219 |
| 4,156,155 | A | * | 5/1979 | Cannell ................ H02K 13/003 310/219 |
| 4,814,657 | A | | 3/1989 | Yano et al. |
| 5,866,967 | A | * | 2/1999 | Sasaki .................... H01R 39/30 310/232 |
| 2003/0162422 | A1 | | 8/2003 | Sobhani |
| 2006/0082243 | A1 | * | 4/2006 | Kerlin .................... H01R 39/30 310/232 |

* cited by examiner

MOTOR OR GENERATOR APPARATUS WITH IONISABLE FLUID-FILLED GAP

RELATED APPLICATION DATA

This U.S. national phase application is based on international application no. PCT/GB2012/052548, which was filed on Oct. 15, 2012, which claimed priority to British national patent application no. 1117798.7, which was filed on Oct. 14, 2011. Priority benefit of these earlier filed applications is hereby claimed.

The present invention relates to apparatus for use as a motor or generator, and particularly but not exclusively to electric motors/generators in which an electrical connection must be made between a fixed part (e.g. stator) and a moving part (e.g. rotor). The invention relates to both rotary and linear forms of apparatus and to uses of such apparatus as sensing/detecting transducers.

In electromagnetic motors/generators in which an electrical connection must be made between a spaced stator and rotor it is common to provide electrically conductive brushes on one of the parts and to provide an electrically conductive commutator on the other. In the case of a DC motor the electrically conductive commutator comprises two or more circumferentially spaced commutator segments configured to selectively engage the brushes during different phases of rotation. In the case of an AC motor, the electrically conductive commutator may be configured to provide a continuous electrical connection to the brushes since the phase change is provided by the alternating voltage supply itself.

One of the disadvantages of the electromagnetic motors/generators of the type discussed above is that contact between the brushes and commutator causes friction losses and wear to the connector parts.

Whilst the electric motor/generator field is dominated by electromagnetic devices, devices for converting between mechanical and electrical energy using electrostatic forces have been proposed in the art. For example, U.S. Pat. No. 4,814,657 discloses an energy converting device comprising a plurality of capacitors each having a pair of spaced electrodes and an inner part moveable between the spaced electrodes in a sliding direction. The inner part has a dielectric permittivity that varies periodically in the sliding direction to change the capacitance of the capacitors during the sliding movement. By charging/discharging the capacitors at a predetermined timing, electrical energy stored in the capacitors can be converted into mechanical energy or vice versa. The problem of providing an electrical connection to spaced parts may similarly apply to such electromagnetic devices.

In accordance with a first aspect of the present invention, there is provided apparatus for use as a motor or generator, comprising: a first part (e.g. stator part) defining a first (e.g. electrical conductor) region; a second part (e.g. rotor part) moveable (e.g. rotatable) relative to the first part and spaced therefrom to form a fluid-filled (e.g. gas-filled) gap, the second part defining a second region separated from the first region by the fluid-filled gap and configured to be electrically connected to the first region during at least one mode of operation; wherein the apparatus is configured to form an electrically conductive path between the first and second regions by generating a region of electrically conductive fluid in the fluid-filled gap between the first and second regions (e.g. a localised region of electrical conductivity in the fluid between (e.g. substantially only between) the first and second regions).

In this way, an effectively frictionless electrical contact between the first and second regions may be achieved with substantially no wearing of parts. Furthermore, any propensity for electrodeposition to occur due to ionisation of the fluid is reversed during each cycle of the apparatus as the polarity is reversed.

The apparatus may be configured to generate the localised region of electrical conductivity in the fluid by applying an electric field to the fluid. In this case, the fluid may be configured to change its electrical properties from an electrical insulator to an electrical conductor when exposed to an electric field. For example, the fluid may be an ionisable fluid (e.g. ionisable gas such as a noble gas or air). In one embodiment, the ionisable fluid forms a plasma (e.g. thermal or non-thermal plasma) when exposed to the electric field (e.g. when exposed to a voltage exceeding a breakdown voltage of the fluid). In another embodiment, the fluid may be a polarisable fluid or a fluid comprising alignable conductive particles (e.g. molecules) dispersed in a non-conductive fluid. In one embodiment, the electric field generated at the first region is configured to generate the localised region of electrical conductivity in the fluid.

In one embodiment, the apparatus may be configured to ionise the fluid (e.g. ionisable gas) in a localised region between the first and second conductor regions. In one embodiment, the electric field generated between the first and second conductor regions is configured to ionise the fluid (e.g. ionisable gas). In one embodiment the electric field generated between the first and second conductor regions is configured in a first mode of operation to stress the fluid beyond its dielectric limit (e.g. to generate a plasma).

The apparatus may be further configured to sustain ionisation of the fluid (e.g. ionisable gas). In one embodiment, the apparatus may be configured to apply a sustain voltage to maintain ionisation of the fluid. For example, the electric field generated at the first region may be configured in a second mode of operation to maintain ionisation of the fluid (e.g. by controlling voltage applied to the first region with first and second control terms, with the first control term corresponding to the voltage required for a demanded force/torque and the second control term being a modulation of the first control term to sustain ionisation of the gas). In another embodiment, the apparatus may further comprise a sustaining device for sustaining ionisation of the fluid. In one embodiment the sustaining device may comprise a photon source.

In one embodiment, the second region is configured to move into and out of alignment with the first region as the second part moves relative to the first part (e.g. to provide one phase of electrical connection in a DC motor). The apparatus may be configured to form a localised region of electrical conductivity in the fluid between (e.g. substantially only between) overlapping sections of the first and second regions during alignment of the first and second regions.

In another embodiment, the second region is configured to maintain alignment with the first region as the second part rotates relative to the first part (e.g. to provide a continuous electrical connection to an AC voltage in an AC motor).

In one embodiment, the second region is a conductor region and electrical connection between the first and second regions generates a magnetic field in one of the first and second parts (e.g. in an electromagnetic motor or generator).

In another embodiment, the second region is a conductor region or a dielectric region forming part of a capacitor assembly and electrical connection of the first and second electrical conductor regions generates an electric field across the capacitor assembly (e.g. in a capacitor motor or generator). In one embodiment, the second region is configured to electrically connect a force-generating component of the capacitor to the first region (i.e. the second region (i.e. conductor region or dielectric region) acts as a commutator only). In an another embodiment, the second region forms a part of a force-generating component of the capacitor (i.e. the second region (i.e. conductor region or dielectric region) acts as both a commutator and force-generating part of the capacitor assembly).

In one embodiment, at least one of the first and second parts comprises an electrically insulating surface (e.g. dielectric surface) exposed to the fluid-filled gap and onto which charge is deposited when the region of electrically conductive fluid is generated between the first and second regions. For example, in the case that one or both of the first and second regions is a conductor region, the or each conductor region may be covered by a dielectric coating defining the electrically insulating surface (e.g. with the dielectric coating being positioned between the conductor region and the fluid-filled gap so that electrons/charged ions forming the region of electrically conductive fluid attracted by the conductor region are deposited on the electrically insulating surface of the dielectric coating). Once charge is deposited on the electrically insulating surface of one of the first and second parts, the deposited charge advantageously acts to repel the other part to assist in maintaining a degree of separation between the first and second parts.

In accordance with a second aspect of the present invention, there is provided apparatus comprising: a first conductor part defining a first conductor region and a second conductor part defining a second conductor region, the first and second conductor parts being spaced apart to define opposed sides of a passageway extending between the first and second conductor regions; and an inner part moveable relative to at least the first conductor part along the passageway extending between the first and second conductor regions, the inner part being spaced from the first conductor part to form a fluid-filled gap; wherein the apparatus is configured to generate a region of electrically conductive fluid in the fluid-filled gap between the first and second conductor regions; and at least one of the first conductor part and the inner part comprises an electrically insulating surface exposed to the fluid-filled gap and onto which charge is deposited when the region of electrically conductive fluid is generated between the first and second conductor regions.

In this way, apparatus is provided in which charge is deposited on the electrically insulating surface of one of the first conductor part and inner part (e.g. attracted by an electric field generating the region of electrically conductive fluid) and the deposited charge acts to repel the other part to assist in maintaining a degree of separation between the first conductor part and inner part.

The first and second conductor parts may form opposed conductor parts of a capacitor assembly.

The apparatus may be configured to generate the localised region of electrical conductivity in the fluid by applying an electric field to the fluid. In this case, the fluid may be configured to change its electrical properties from an electrical insulator to an electrical conductor when exposed to an electric field. For example, the fluid may be an ionisable fluid (e.g. ionisable gas such as a noble gas or air). In one embodiment, the ionisable fluid forms a plasma (e.g. thermal or non-thermal plasma) when exposed to the electric field (e.g. when exposed to a voltage exceeding a breakdown voltage of the fluid). In another embodiment, the fluid may be a polarisable fluid or a fluid comprising alignable conductive particles (e.g. molecules) dispersed in a non-conductive fluid. In one embodiment, the electric field generated at the first region is configured to generate the localised region of electrical conductivity in the fluid.

In one embodiment, the apparatus may be configured to ionise the fluid (e.g. ionisable gas) in a localised region between the first and second conductor regions. In one embodiment, the electric field generated between the first and second conductor regions is configured to ionise the fluid (e.g. ionisable gas). In one embodiment the electric field generated between the first and second conductor regions is configured in a first mode of operation to stress the fluid beyond its dielectric limit (e.g. to generate a plasma).

The apparatus may be further configured to sustain ionisation of the fluid (e.g. ionisable gas). In one embodiment, the apparatus may be configured to apply a sustain voltage to maintain ionisation of the fluid. For example, the electric field generated at the first region may be configured in a second mode of operation to maintain ionisation of the fluid (e.g. by controlling voltage applied to the first region with first and second control terms, with the first control term corresponding to the voltage required for a demanded force/torque and the second control term being a modulation of the first control term to sustain ionisation of the gas). In another embodiment, the apparatus may further comprise a sustaining device for sustaining ionisation of the fluid. In one embodiment the sustaining device may comprise a photon source.

In one embodiment, the inner part comprises an electrically conductive body covered by a dielectric coating defining the electrically insulating surface (e.g. with the dielectric coating being positioned between the electrically conductive body and the fluid-filled gap so that electrons/charged ions forming the region of electrically conductive fluid attracted by the second conductor region/repelled by the first conductor region are deposited on the electrically insulating surface of the dielectric coating).

In one embodiment, the inner part comprises an electrically insulating body (e.g. formed from high dielectric constant material) defining the electrically insulating surface.

In one embodiment, the inner part is moveable relative the second conductor part and spaced therefrom to form a further fluid-filled gap and the apparatus is configured to generate a further region of electrically conductive fluid in the further fluid-filled gap between the first and second conductor regions. The first-defined and further fluid-filled gaps may or may not be in fluid communication with one another.

In one embodiment, at least one of the second conductor part and the inner part comprises a further electrically insulating surface exposed to the further fluid-filled gap and onto which charge is deposited when the region of electrically conductive fluid is generated between the first and second conductor regions.

In one embodiment, the passageway defined by the first and second conductor parts includes a first part in which spacing between the opposed sides of the passageway decreases in a direction of motion of the inner part from a first spacing to a second spacing. The passageway may further comprises a second part located after the first part in which spacing between the opposed sides of the passageway is substantially constant (e.g. an extended section in which the spacing is equal to the second spacing).

In one embodiment, movement of inner part relative to the first conductor part defines a circumferential path extending though the passageway.

In one embodiment, the inner part has an annular profile defining a central axis and the inner part is configured to rotate about the central axis.

In one embodiment, the first-defined and further electrically insulating surfaces are formed on outer and inner surfaces of the inner part respectively.

In accordance with a third aspect of the present invention, there is provided an electrostatic bearing comprising apparatus as defined in the second aspect of the present invention.

In accordance with a fourth aspect of the present invention, there is provided a motor for mounting in a wheel comprising apparatus as defined in any of the preceding aspects of the present invention.

In accordance with a fifth aspect of the present invention, there is provided a wheel for a vehicle comprising the motor of the fourth aspect of the present invention.

In accordance with a sixth aspect of the present invention, there is provided a sensor/detector transducer comprising apparatus as defined in any of the preceding aspects of the present invention.

In accordance with a seventh aspect of the present invention, use of apparatus as defined in any of the preceding aspects of the invention as a motor.

In accordance with a eighth aspect of the present invention, use of apparatus as defined in any of the preceding aspects of the invention as a generator.

In accordance with a ninth aspect of the present invention, use of apparatus as defined in any of the preceding aspects of the invention as a sensor/detector transducer.

In accordance with a tenth aspect of the present invention, there is provided a method of maintaining separation between a first part and a second part movable relative to the first part and spaced therefrom by a gap, at least one of the first and second parts comprising an electrically insulating surface exposed to the gap, the method comprising: providing a region of electrically conductive fluid in a gap between the first and second parts; and applying an electric field between the first and second parts to cause charge to be deposited on the electrically insulating surface, whereby the deposited charge generates a repulsive force between the first and second parts for maintaining the gap therebetween (e.g. repelling a charged conductor region on the other part).

In one embodiment, the region of electrically conductive fluid is generated by applying an electric field to a fluid. The fluid may be configured to change its electrical properties from an electrical insulator to an electrical conductor when exposed to an electric field. For example, the fluid may be an ionisable fluid (e.g. ionisable gas such as a noble gas or air). In one embodiment, the ionisable fluid forms a plasma (e.g. thermal or non-thermal plasma) when exposed to the electric field (e.g. when exposed to a voltage exceeding a breakdown voltage of the fluid). In another embodiment, the fluid may be a polarisable fluid or a fluid comprising alignable conductive particles (e.g. molecules) dispersed in a non-conductive fluid. In one embodiment, the electric field generated at the first region is configured to generate the localised region of electrical conductivity in the fluid.

In one embodiment, the region of electrically conductive fluid is generated by ionising the fluid (e.g. ionisable gas) in a localised region between the first and second parts (e.g. between first and second conductor regions provided on the first and second parts). In one embodiment, the electric field generated between the first and second parts is configured to ionise the fluid (e.g. ionisable gas). In one embodiment the electric field generated between the first and second parts is configured in a first mode of operation to stress the fluid beyond its dielectric limit (e.g. to generate a plasma).

The method may further comprise sustaining ionisation of the fluid (e.g. ionisable gas). In one embodiment, the method comprises applying a sustain voltage to maintain ionisation of the fluid. For example, the electric field generated at the first region may be configured in a second mode of operation to maintain ionisation of the fluid (e.g. by controlling voltage applied to the first region with first and second control terms, with the first control term corresponding to the voltage required for a demanded force/torque and the second control term being a modulation of the first control term to sustain ionisation of the gas). In another embodiment, the method may further comprise use of a sustaining device for sustaining ionisation of the fluid. In one embodiment the sustaining device may comprise a photon source.

In one embodiment, the at least one of the first and second parts comprises an electrically conductive body covered by a dielectric coating defining the electrically insulating surface.

In one embodiment, the at least one of the first and second parts comprises an electrically insulating body defining the electrically insulating surface.

Embodiments of the present invention will now be described by way of example with reference to the accompanying drawings in which.

Figure 1:
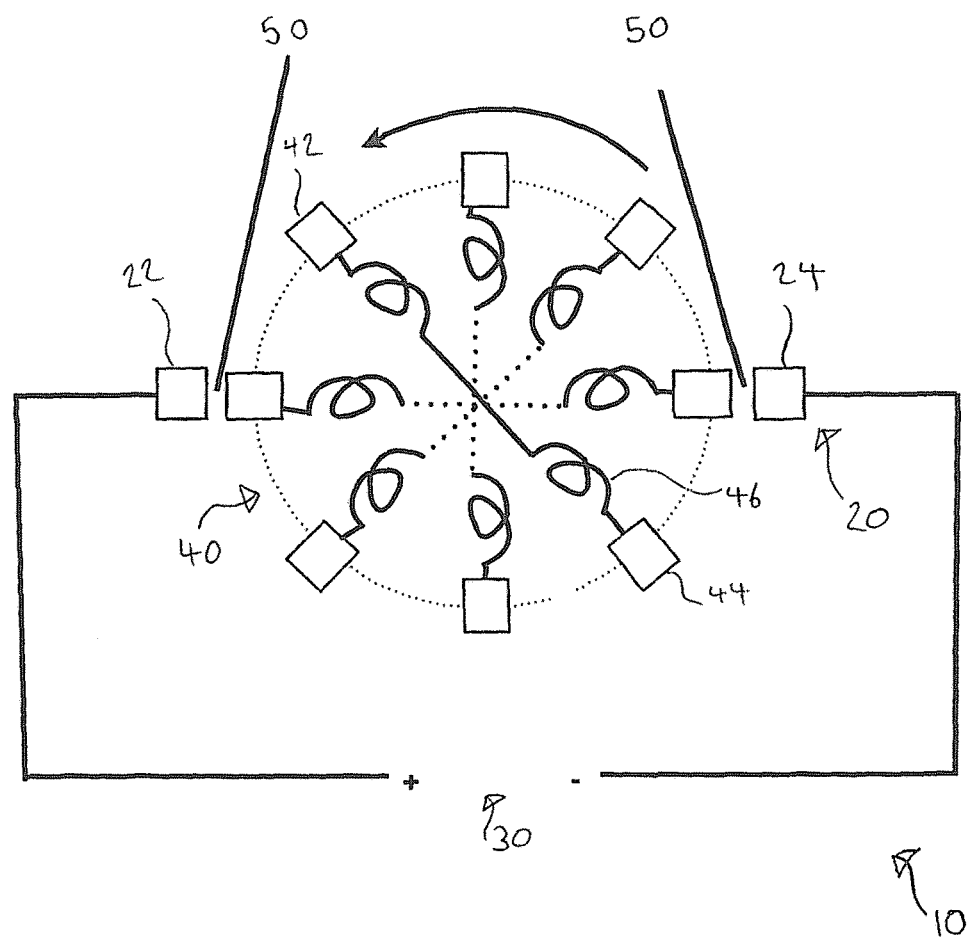
FIG. 1 shows a schematic view of an electromagnetic machine according to a first embodiment of the present invention.

FIG. 1 shows an electromagnetic machine 10 comprising: a stator 20 defining an opposed pair of electrically conductive stator plates/electrodes 22, 24 connected to a DC or AC power source 30; and a rotor 40 defining diametrically opposed electrically conductive rotor plates 42, 44 connected by a low resistance conductor coil connector 46. Rotor 40 is rotatable relative to stator 20 and spaced therefrom to form an air gap 50. In use as a motor, machine 10 is configured to form an electrically conductive path between adjacent pairs of stator plates 22, 24 and rotor plates 42, 44, whereby an electric current passes between stator plates 222, 24 through coil connector 46 to generate a magnetic field alignable with an external magnetic field (not shown) to generate rotation of rotor 40 relative to stator 20.

Machine 10 is configured to form the electrically conductive path between adjacent pairs of stator plates 22, 24 and rotor plates 42, 44 by generating a region of electrically conductive fluid (or "plasma commutator") in air gap 50 between the adjacent pairs of plates. Once ionisation occurs current will flow and the motor will behave as if a direct connection existed. Due to back-emf which will be induced in any electromagnetic rotation machine, there will come a time when the back-emf rises to a level that leaves less than the ionisation voltage. At this point the current will stop flowing and the motor can be said to have reached its maximum attainable speed.

There is a substantial degree of "voltage headroom" to provide for overcoming back-emf since the air gap may be relatively small compared to the assumed voltage being applied. For example, for an air gap in the order of 0.1 mm a voltage of between 200 and 300 v may be applied to stator plates 22, 24 in order to ionise the air gap. If the applied voltage is always greater than the ionisation voltage (e.g. 400 to 500 v for a 0.1 mm air gap) then ionisation will always occur and thus provide the conduction path for current flow and the voltage necessary to overcome back-emf to achieve a maximum desired motor speed.

Although machine 10 is described in terms of a motor, it may equally operate as a generator or any other type of electro-mechanical transducer (e.g. sensor/detector transducer). Whilst coil connector 46 is illustrated as being diametrically disposed, it may alternatively be disposed axially relative to the axis of rotation.

Figure 2:
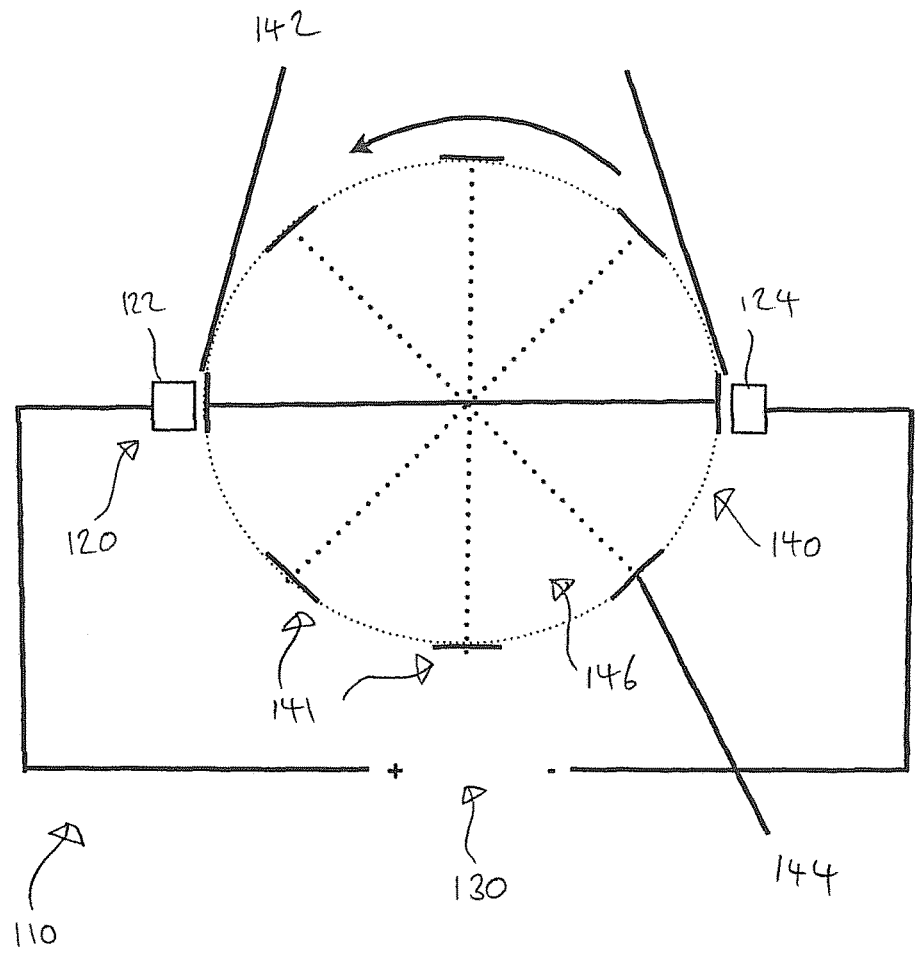
FIG. 2 shows a schematic view of a capacitor machine according to a second embodiment of the present invention.

FIG. 2 shows a capacitor machine 110 comprising: a stator 120 defining an opposed pair of electrically conductive stator plates/electrodes 122, 124 connected to a DC or AC power source 130; and a rotor 140 defining a plurality of circumferentially spaced segments 141 each comprising diametrically opposed rotor regions 142, 144 of a capacitor assembly 146. In each segment 141, rotor regions 142, 144 may be outer conductor regions of capacitor assembly 146 (e.g. conductive rotor plates forming a plurality of commutator segments) or inner dielectric regions of capacitor assembly 146 (e.g. exposed faces of a dielectric material configured to be positioned between stator plates 122, 124 and a further conductor plate).

Rotor 140 is rotatable relative to stator 120 and spaced therefrom to form an air gap 150. In use as a motor, machine 110 is configured to form an electrically conductive path between adjacent pairs of stator plates 122, 124 and rotor regions 142, 144 to generate an electric field (e.g. electrostatic field) across capacitor assembly 146 to generate rotation of rotor 140 relative to stator 120.

Machine 110 is configured to form the electrically conductive path between adjacent pairs of stator plates 122, 124 and rotor regions 142, 144 by generating a region of electrically conductive fluid (or "plasma commutator") in air gap 150 between the adjacent pairs of plates. Once ionisation occurs, charge can be transferred to or from rotor 140. In the case of rotor regions 142, 144 that are inner dielectric regions of capacitor assembly 146, charge may be deposited on the exposed face of the dielectric material when the electrically conductive path is formed in air gap 150.

Since air gap 150 may be very small (e.g. in the order of 0.1 mm), a voltage of between 200 and 300 v may be applied to stator plates 122, 124 in order to ionise the air gap.

Although machine 110 is described in terms of a motor, it may equally operate as a generator or any other type of electro-mechanical transducer (e.g. sensor/detector transducer). Furthermore, in the case that rotor regions 142, 144 are outer conductor regions of capacitor assembly 146 (i.e. forming a plurality of commutator segments) rotor regions 142, 144 may be connected to a further pair of conductor plates intended to develop a force/torque (i.e. with rotor regions 142, 144 acting as a commutator only). In another embodiment, rotor regions 142, 144 may be used to develop a force/torque and so combine the attributes of both functions.

In each of the embodiments of FIG. 1 and FIG. 2, an electrical insulation layer with a high dielectric constant (for example greater than 2 and preferably greater than 100) may be applied over the surface of a moving conductor plate whereby a charge is deposited on the insulation layer and sustained until it approaches an opposite polarity conductor plate where the deposited charge is stripped off and replaced with the opposite polarity charge for the cycle to repeat up to the next conductor plate. As the charged surface moves progressively under the electrode that created the charge, there is a repulsive force that assists with setting and maintaining the running clearance between the electrodes.

Figure 3:
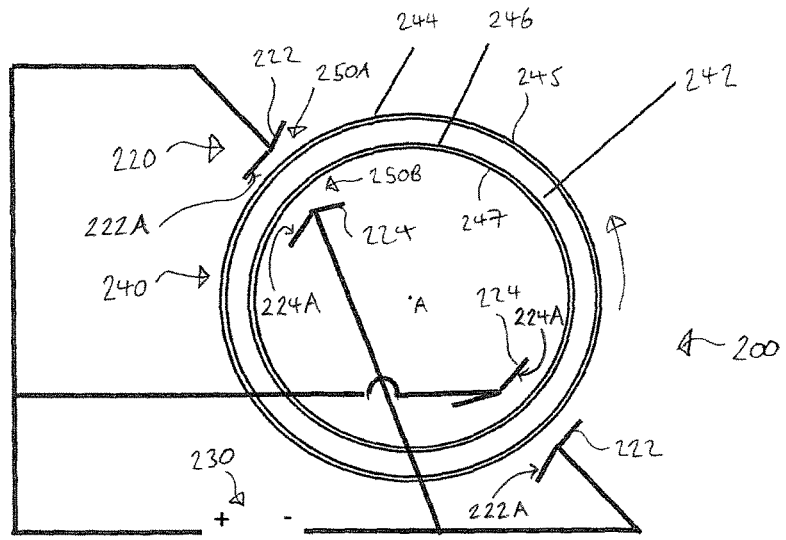
FIG. 3 shows a schematic view of apparatus according to a third embodiment of the present invention.

FIG. 3 shows apparatus 200 comprising: a stator 220 defining a plurality of opposed pairs of electrically conductive stator plates/electrodes 222, 224 connected to a DC or AC power source 230; and a rotor 240 having an annular cross-sectional profile defining a central axis "A" around which rotor 240 rotates relative to the stators plates As shown, outer stator plates 222 are positioned next to outer surface of rotor 240 and are spaced from the rotor 240 by an outer air gap 250A. Inner stator plates 244 are positioned next to an inner surface of rotor 240 and are spaced from the rotor 240 by an inner air gap 250B.

In one embodiment, rotor 240 includes a central metallic core 242 (e.g. formed by a plain cylinder of aluminium) covered by an outer dielectric coating 244 defining an outer electrical insulating surface 245 and by an inner dielectric coating 246 defining an outer electrical insulating surface 247. In another embodiment, rotor 240 comprises a high dielectric constant core itself defining outer and inner electrically insulating surfaces 245, 247.

Apparatus 200 is configured to generate a region of electrically conductive fluid in the outer and inner air gaps 250A, 250B between the adjacent pairs of electrically conductive stator plates 222, 224 as previously described with reference to the embodiments of FIGS. 1 and 2.

As the air gaps 250A, 250B become ionized charge is deposited onto the outer and inner electrically insulating surfaces 245, 247 of rotor 240. This produces a repulsive force between each rotor surface and its adjacent electrode 222, 224. As discussed in more detail below, this repulsive force can be arranged to be radial and tangential so that running gap is maintained/formed and force/torque is developed to drive rotation of the rotor 240.

Figure 4:
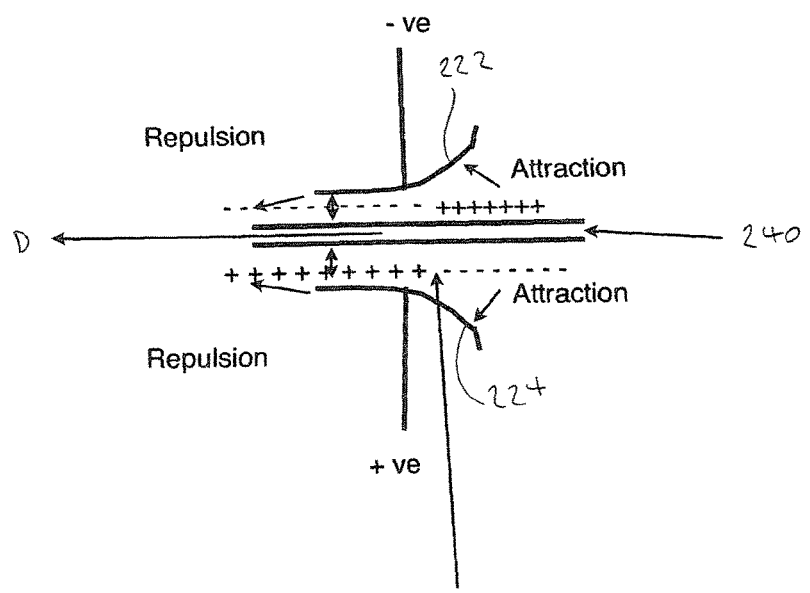
FIG. 4 shows details of a part of the apparatus of FIG. 3.

As illustrated in FIG. 4, each pair of electrically conductive stator plates 222, 224 is configured to taper along a first (leading section) so that a progressive narrowing of the running gap occurs in the direction of rotor movement "D". Charge deposited by one set of electrodes has an opposite polarity that is attractive to the next pair of electrodes. As rotor 240 rotates and the deposited charge approaches the next pair of electrodes, the charge is attracted in until the tapered gap reaches a point where ionization again occurs stripping off the charge and immediately replacing it with charge of the opposite polarity which is now of the same polarity as the electrodes and results in a repulsion force between the rotor and the electrode. By arranging the geometry of the electrodes so that ionization occurs at the point where the electrode becomes substantially parallel or tangential to the rotor surface (the ionization event occurs when the distance between the charged rotor and tapered electrodes reaches a critical value), the repulsive force is directed substantially in the radial direction and subsequently in the direction of motion and does not oppose the direction of motion.

In use, apparatus 200 may be used as a motor or generator (e.g. electromagnetic or electrostatic device as previously described with reference to FIGS. 1 and 2), or as an electrostatic bearing.

The invention claimed is:

1. Apparatus for use as a motor or generator, comprising:
   a first part defining a first electrode;
   a second part moveable relative to the first part and spaced therefrom to form a fluid-filled gap, the second part defining a second electrode separated from the first electrode by the fluid-filled gap and configured to be electrically connected to the first electrode during at least one mode of operation;
   wherein the first and second parts are configured to form an electrically conductive path between the first and second electrodes by generating a localised region of electrical conductivity in the fluid in the fluid-filled gap between the first and second electrodes;

wherein a fluid in the fluid-filled gap is an ionisable fluid; and wherein the first and second parts are configured to generate the localised region of electrical conductivity in the fluid via application of an electric field to the fluid, the electric field causing the fluid to change from an electrical insulator to an electrical conductor by exposure to the electric field such that the localised region is substantially only between the first and second electrodes.

2. Apparatus according to claim 1, wherein the second electrode is configured to move into and out of alignment with the first electrode as the second part moves relative to the first part.

3. Apparatus according to claim 2, wherein the first and second parts are configured to form a localised region of electrical conductivity in the fluid between overlapping sections of the first and second electrodes during alignment of the first and second electrodes.

4. Apparatus according to claim 1, wherein the second electrode is configured to maintain alignment with the first electrode as the second part rotates relative to the first part.

5. Apparatus according to claim 1, wherein electrical connection between the first and second electrodes generates a magnetic field in one of the first and second parts.

6. Apparatus according to claim 1, wherein the second electrode forms part of a capacitor assembly and electrical connection of the first and second electrodes generates an electric field across the capacitor assembly.

7. Apparatus according to claim 6, wherein the second electrode is configured to electrically connect a force-generating component of the capacitor to the first electrode.

8. Apparatus according to claim 6, wherein the second electrode forms a part of a force-generating component of the capacitor.

9. Apparatus according to claim 1, wherein at least one of the first and second parts comprises an electrically insulating surface exposed to the fluid-filled gap and onto which charge is deposited when the region of electrically conductive fluid is generated between the first and second electrodes.

10. A motor for mounting in a wheel comprising apparatus as defined in claim 1.

11. A wheel for a vehicle comprising the motor of claim 10.

12. A sensor/detector transducer comprising apparatus as defined claim 1.

13. Apparatus comprising:

an electrostatic bearing;

wherein the electrostatic bearing comprises:

a first conductor part defining a first conductor region and a second conductor part defining a second conductor region, the first and second conductor parts being spaced apart to define opposed sides of a passageway extending between the first and second conductor regions; and an inner part moveable relative to at least the first conductor part along the passageway extending between the first and second conductor regions, with movement of the inner part relative to the first conductor part defining a circumferential path extending through the passageway, the inner part being spaced from the first conductor part to form a fluid-filled gap;

wherein the electrostatic bearing is configured to generate a region of electrical conductivity in the fluid in the fluid-filled gap between the first and second conductor regions;

wherein at least one of the first conductor part and the inner part comprises a radially facing electrically insulating surface exposed to the fluid-filled gap and onto which charge is deposited when the region of electrically conductive fluid is generated between the first and second conductor regions, whereby a radial repulsive force is produced between the first conductor part and the inner part;

wherein the fluid in the fluid-filled gap is an ionisable fluid; and wherein the first and second conductor parts are configured to generate the region of electrical conductivity in the fluid via application of an electric field to the fluid, the electric field causing the fluid to change from an electrical insulator to an electrical conductor by exposure to the electric field.

14. Apparatus according to claim 13, wherein the inner part comprises an electrically conductive body covered by a dielectric coating defining the electrically insulating surface.

15. Apparatus according to claim 13, wherein the inner part comprises an electrically insulating body defining the electrically insulating surface.

16. Apparatus according to claim 13, wherein the inner part is moveable relative the second conductor part and spaced therefrom to form a further fluid-filled gap and the electrostatic bearing is configured to generate a further region of electrically conductive fluid in the further fluid-filled gap between the first and second conductor regions.

17. Apparatus according to claim 16, wherein at least one of the second conductor part and the inner part comprises a further electrically insulating surface exposed to the further fluid-filled gap and onto which charge is deposited when the region of electrically conductive fluid is generated between the first and second conductor regions.

18. Apparatus according to claim 17, wherein the first-defined and further electrically insulating surfaces are formed on outer and inner surfaces of the inner part respectively.

19. Apparatus according to claim 13, wherein the passageway defined by the first and second conductor parts includes a first part in which spacing between the opposed sides of the passageway decreases in a direction of motion of the inner part from a first spacing to a second spacing.

20. Apparatus according to claim 19, wherein the passageway further comprises a second part located relative to the direction of motion of the inner part after the first part in which spacing between the opposed sides of the passageway is substantially constant.

21. Apparatus according to claim 13, wherein movement of inner part relative to the first conductor part defines a circumferential path extending though the passageway.

22. Apparatus according to claim 21, wherein the inner part has an annular profile defining a central axis and the inner part is configured to rotate about the central axis.

* * * * *